United States Patent
Simionescu et al.

(10) Patent No.: US 10,169,232 B2
(45) Date of Patent: Jan. 1, 2019

(54) ASSOCIATIVE AND ATOMIC WRITE-BACK CACHING SYSTEM AND METHOD FOR STORAGE SUBSYSTEM

(71) Applicant: Seagate Technology LLC, Cupertino, CA (US)

(72) Inventors: Horia Cristian Simionescu, Foster City, CA (US); Balakrishnan Sundararaman, Austin, TX (US); Shashank Nemawarkar, Austin, TX (US); Larry Stephen King, Austin, TX (US); Mark Ish, Castro Valley, CA (US); Shailendra Aulakh, Austin, TX (US)

(73) Assignee: Seagate Technology LLC, Cupertino, CA (US)

( * ) Notice: Subject to any disclaimer, the term of this patent is extended or adjusted under 35 U.S.C. 154(b) by 328 days.

(21) Appl. No.: 15/048,080

(22) Filed: Feb. 19, 2016

(65) Prior Publication Data

US 2017/0242794 A1   Aug. 24, 2017

(51) Int. Cl.
*G06F 13/36* (2006.01)
*G06F 12/0806* (2016.01)
*G06F 12/0804* (2016.01)
*G06F 12/1018* (2016.01)
*G06F 12/1081* (2016.01)
*G06F 12/122* (2016.01)

(52) U.S. Cl.
CPC ...... *G06F 12/0806* (2013.01); *G06F 12/0804* (2013.01); *G06F 12/1018* (2013.01); *G06F 12/1081* (2013.01); *G06F 12/122* (2013.01); *G06F 2212/1024* (2013.01); *G06F 2212/604* (2013.01); *G06F 2212/621* (2013.01); *G06F 2212/656* (2013.01); *G06F 2212/69* (2013.01)

(58) Field of Classification Search
CPC .. G06F 12/0815; G06F 3/0619; G06F 9/3004; G06F 9/3834; G06F 3/061
See application file for complete search history.

(56) References Cited

U.S. PATENT DOCUMENTS

| | | | |
|---|---|---|---|
| 6,845,426 B2* | 1/2005 | Kuwata | G06F 3/0613 711/113 |
| 9,430,396 B2* | 8/2016 | Kumar | G06F 12/0891 |
| 2013/0205097 A1 | 8/2013 | Flynn et al. | |
| 2013/0346692 A1 | 12/2013 | Fuller et al. | |
| 2014/0344503 A1* | 11/2014 | Deguchi | G06F 12/0815 711/103 |
| 2017/0097908 A1* | 4/2017 | Simionescu et al. | G06F 13/28 |

* cited by examiner

*Primary Examiner* — Idriss N Alrobaye
*Assistant Examiner* — Richard B Franklin (57) ABSTRACT

In response to a cacheable write request from a host, physical cache locations are allocated from a free list, and the data blocks are written to those cache locations without regard to whether any read requests to the corresponding logical addresses are pending. After the data has been written, and again without regard to whether any read requests are pending against the corresponding logical addresses, metadata is updated to associate the cache locations with the logical addresses. A count of data access requests pending against each cache location having valid data is maintained, and a cache location is only returned to the free list when the count indicates no data access requests are pending against the cache location.

18 Claims, 11 Drawing Sheets

ASSOCIATIVE AND ATOMIC WRITE-BACK CACHING SYSTEM AND METHOD FOR STORAGE SUBSYSTEM

FIELD OF INVENTION

The invention relates generally to data storage systems and, more specifically, to data storage systems having cache memory.

BACKGROUND

A data storage subsystem having a cache memory can serve as a buffer for frequently accessed data between a host computer system and back-end data storage, such as disk drive arrays or non-volatile (e.g., flash) memory arrays. A data storage subsystem having a cache memory may be, for example, in the form of an accelerator card that promotes low data access latency between the host and the back-end data storage. A caching system may determine the frequency with which data stored in the cache memory is accessed, and maintain only the most frequently accessed data in the cache memory while evicting the least frequently accessed data.

In a caching system, it is desirable to minimize latency, which is the amount of time between receiving a request from the host to write or read data and completing the write or read operation. A property that impacts latency is the look-up time required for the caching system to translate the logical addresses identified by the host into the physical storage locations in the cache memory and the time required for the caching system to subsequently transfer data to or from those storage locations.

A common type of caching is known as "write back," in which data received from the host in a write request is first stored in the cache memory and made available for the host to read, and then later copied to back-end storage when conditions facilitate the copy operation having less impact on latency. Data that is stored in cache memory but which has not yet been copied to back-end storage is commonly referred to as "dirty" data. A drawback of write-back caching is that dirty data may be vulnerable to loss due to system failures, such as power interruptions. Similarly, data loss can result from such failures interrupting the process of storing data in the cache memory, which can undesirably result in a sequence of storage locations containing a portion of the data associated with a first write request and a portion of the data associated with a subsequent write request.

A caching system may be direct-mapped, fully associative, or a hybrid of such types. In a direct-mapped caching system, the logical address of a data block is mapped to only one address or physical location in the cache memory at which the data block can be stored. For example, the physical address may be computed by modular arithmetic: cache address=logical address MOD(number of addresses in cache memory). In contrast, in a fully associative caching system, a cache block can be stored in any physical memory location in the cache memory. A fully associative caching system generally benefits memory usage efficiency and hit rate. However, a drawback of a fully associative caching system is that the look-up process for translating the logical addresses identified into the physical storage locations in the cache memory can be slow and thus impact latency.

SUMMARY

Embodiments of the invention relate to a caching system and method of operation. In an exemplary embodiment, the caching system includes a cache memory and a processing system that is programmed or configured to effect the method.

In an exemplary embodiment, the method includes: receiving a write request indicating one or more logical addresses and one or more data blocks to be written correspondingly to the one or more logical addresses; in response to the write request, allocating one or more physical locations in a cache memory from a free list; storing the one or more data blocks in the one or more physical locations without regard to whether any read requests to the one or more logical addresses are pending; after the one or more data blocks have been stored in the one or more physical locations, and without regard to whether any read requests are pending against the one or more logical addresses, updating metadata to associate the one or more physical locations with the one or more logical addresses; maintaining a use count of data access requests, including read requests, pending against each physical location in the cache memory having valid data; and returning a physical location to the free list when the use count indicates no data access requests are pending against the physical location.

WRITTEN DESCRIPTION

Figure 1:
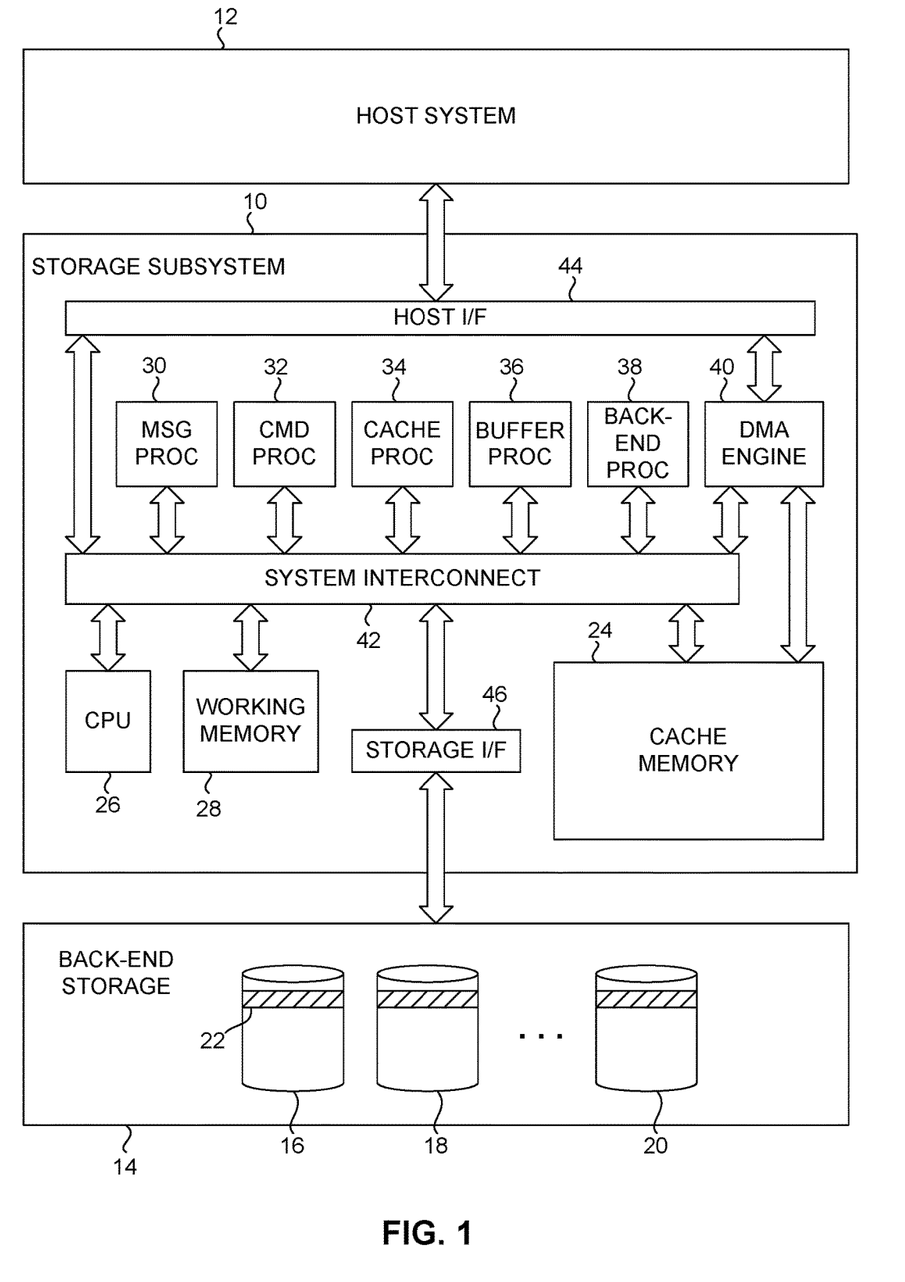
FIG. 1 is a block diagram illustrating a caching system in accordance with an exemplary embodiment of the invention.

As illustrated in FIG. 1, in an illustrative or exemplary embodiment of the invention, a storage subsystem 10 provides caching between a host system 12 and back-end storage 14. Host system 12 may be any type of conventional computer system or network of computer systems. Back-end storage 14 may be any type of conventional data mass-storage system. For example, back-end storage 14 may comprise an array of multiple physical data storage devices 16, 18, 20, etc. Examples of such physical data storage devices 16, 18, 20, etc., include disk drives, flash memory modules, and other types of non-volatile data storage devices.

In the exemplary embodiment described herein, the array of multiple physical data storage devices 16, 18, 20, etc., in back-end storage 14 may conform to one or more of the principles commonly referred to under the umbrella of "RAID" or "redundant array of independent (or inexpensive) disks." For example, in accordance with a common RAID principle known as striping, back-end storage 14 may store data in units of stripes 22. Each of physical data storage devices 16, 18, 20, etc., stores a portion of each stripe 22. Back-end storage 14 may include any number of physical storage devices 16, 18, 20, etc. (The ellipsis symbol (" . . . ") in FIG. 1 indicates additional physical data storage devices included in the array but which are not individually shown for purposes of clarity.) As RAID principles such as striping are well understood by persons of skill in the art, such principles are not described in further detail herein. Also, the foregoing description of back-end storage 14 as comprising multiple physical data storage devices 16, 18, 20, etc., such as disks, or conforming to RAID principles, etc., is provided only for the purpose of describing an exemplary data storage environment or context with which the invention may be associated, and is not intended to be limiting. For example, the term "logical address" as used herein should not be construed as limiting the invention to any specific physical data storage environment, organization, scheme, etc.

In the exemplary embodiment, storage subsystem 10 includes a cache memory 24. Cache memory 24 may be of any type, such as, for example, double data rate dynamic random access memory (DDR-DRAM). Storage subsystem 10 also includes a central processing unit (CPU) 26 and a working memory 28. Working memory 28 may be of any type, such as, for example, static RAM. While CPU 26 may perform generalized processing tasks, storage subsystem 10 further includes the following specialized processing elements: a message processor 30, a command processor 32, a cache processor 34, a buffer processor 36, a back-end processor 38, and a direct memory access (DMA) engine 40. Although in the exemplary embodiment storage subsystem 10 includes these specialized processing elements, other embodiments may include fewer or more processing elements, which in such other embodiments may perform some or all of the processing operations described herein. Storage subsystem 10 also includes a system interconnect 42, such as system or matrix of busses, through which the above-referenced processing elements communicate with each other. Other communication or signal paths among the above-referenced elements also may be included. A host interface 44, through which storage subsystem 10 communicates with host system 12, and a storage interface 46, through which storage subsystem 10 communicates with back-end storage 14, may also be included. Host interface 44 may conform to a communication bus standard, such as, for example, Peripheral Component Interconnect Express (PCIe) and include an associated PCIe controller. Other interfaces, such as memory interfaces and associated memory controllers, also may be included but are not shown for purposes of clarity. Although not shown, storage subsystem 10 may define a portion of an accelerator card that plugs into a backplane or motherboard of host system 12. Some or all of the above-referenced processing elements may be included in an integrated circuit device (not shown), such as a field-programmable gate array (FPGA), application-specific integrated circuit (ASIC), or other device.

Figure 2:
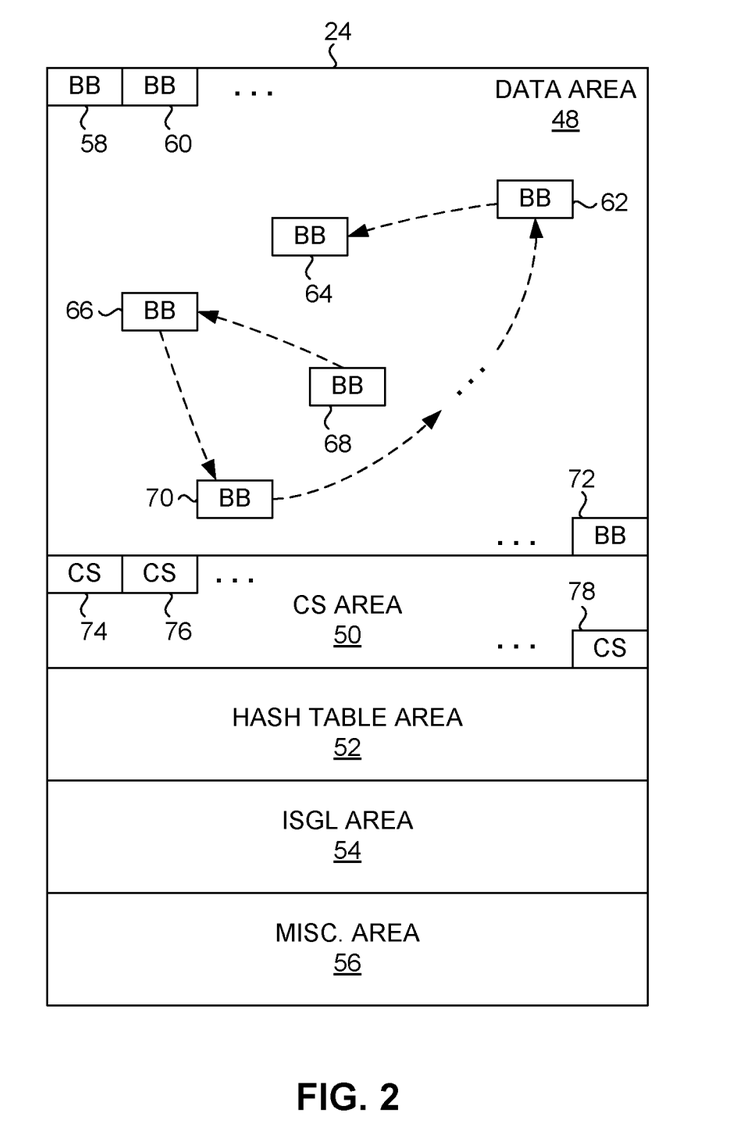
FIG. 2 is a conceptual diagram illustrating a generalized map of the cache memory, in accordance with the exemplary embodiment.

As illustrated in FIG. 2, cache memory 24 may be used to store several types of caching-related information described below. However, in other embodiments different types of data may be stored in different memories or organized in any other manner. In the exemplary embodiment cache memory 24 includes a data area 48, a cache segment (CS) area 50, a hash table area 52, a scatter-gather list (SGL) area 54, and a miscellaneous area 56. As appreciated by one of skill in the art, in FIG. 2 the spatial arrangements of these areas of cache memory 24 are depicted in a conceptual manner for purposes of clarity, and information may be mapped or otherwise arranged in cache memory 24 or other memory in any manner.

Cached data is stored in data area 48 in units referred to as buffer blocks. The unit defines an amount of data, such as, for example, 4 kilobytes (KB). The term "block" means that the data is contiguous. In an exemplary embodiment in which the above-referenced stripe 22 consists of, for example, 64 KB, each stripe 22 thus corresponds to 16 buffer blocks. As described in further detail below, any buffer block can be cached or stored in any available physical location (i.e., address) in data area 48 without regard to any ordering of the buffer blocks and without regard to any relationship between physical and logical addresses of the buffer blocks. As a result, buffer blocks corresponding to a stripe 22 are not necessarily stored contiguously with each other. This characteristic is referred to as associativity.

For purposes of illustration, some exemplary buffer blocks 58, 60, 62, 64, 66, 68, 70, 72, etc., are depicted as stored in various physical locations in data area 48. (The ellipsis symbols in data area 48 indicate additional buffer blocks in additional physical locations that are not shown for purposes of clarity.) The storage capacity of data area 48 may be substantially less than the storage capacity of back-end storage 14. For example, the storage capacity of back-end storage 14 may be on the order of terabytes, while the storage capacity of data area 48 may be on the order of gigabytes or megabytes. To facilitate processing, a physical location in data area 48 may be identified by a buffer block identifier (BBID) that serves as an index or offset from a physical memory address. As described below with regard to an example, exemplary buffer blocks 68, 66, 70, 62 and 64 are ordered in the manner indicated by the broken-line arrows, with exemplary buffer block 68 being the first of a sequence, and exemplary buffer block 64 being the last of the sequence (with additional buffer blocks being indicated by the ellipsis symbol but not shown for purposes of clarity). That exemplary buffer blocks 58, 60, 62, 64, 66, 68, 70 and 72 are depicted in FIG. 2 as scattered throughout data area 48 rather than grouped together is intended to exemplify associativity.

For purposes of illustration, some exemplary cache segments 74, 76, 78, etc., are depicted as stored in physical locations in cache segment area 50. Additional cache segments are indicated by the ellipsis symbol but not shown for purposes of clarity. As described below in further detail, a cache segment is a data structure that contains metadata describing the cached buffer blocks.

Figure 3:
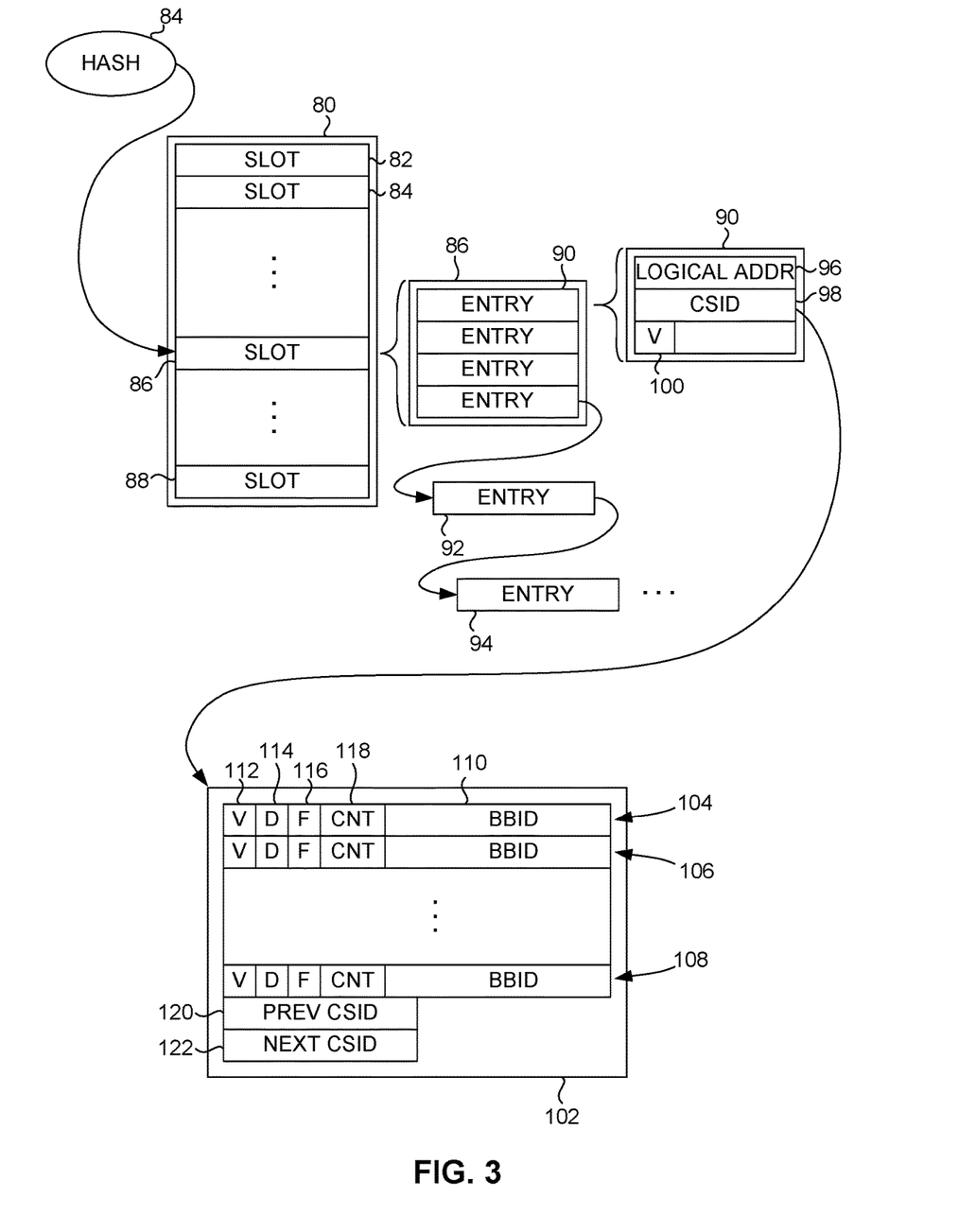
FIG. 3 is a data relationship diagram, illustrating exemplary relationships among data structures, in accordance with the exemplary embodiment.

The manner in which a hash table 80 relates to a cache segment 102 is illustrated in FIG. 3. Hash table 80 may be stored in hash table area 52 (FIG. 2). A hash function 84 is applied to a logical address of data that is the subject of a write operation or a read operation (which may also respectively be referred to as a write input/output (I/O) operation and read I/O operation) initiated by host system 12. A write or read operation is generally initiated in response to storage subsystem 10 receiving from host 12: a write request or read request, an indication of the amount of data to be written or read, and one or more logical addresses of the data. As well understood by one of ordinary skill in the art, the term "logical address" refers to the address space in which host system 12 operates upon data, in contrast with the physical address spaces in which storage subsystem 10 and back-end storage 14 operate upon data.

Hash table 80 comprises a number (n) of slots, of which a first exemplary slot 82, a second exemplary slot 84, etc., through another exemplary slot 86, and up to a last or "nth" exemplary slot 88 are shown, with additional slots indicated by ellipsis symbols but not shown for purposes of clarity. Although hash table 80 may have any number of slots, the number is generally substantially less than the number of logical addresses in the host address space. An example of hash function 84 is: Slot=(LBA)MOD(n), where "Slot" represents an index to a slot in hash table 80, "LBA" represents a logical address, and MOD or modulo is the modular arithmetic function. As the use of a hash function to index a table is well understood in the art, further details are not described herein.

Each slot has multiple entries 90. For example, each slot of hash table 80 may have four entries 90. Employing multiple (i.e., two or more) entries 90 per hash table slot rather than a single entry per hash table slot can help minimize "collisions," as hash table address conflicts are commonly referred to in the art. As described below, (in the case of a miss) any empty entry 90 within a slot can be used to fulfill a write request. In an instance in which all of the entries of a slot are occupied, then additional entries 92, 94, etc., can be added in the form of a linked list.

Each entry 90 includes a logical address field 96, a cache segment identifier (CSID) field 98, and a valid entry field or bit (V) 100. As described below with regard to examples of write and read operations, cache segment identifier field 98 is configured to store a cache segment identifier (e.g., a pointer) that identifies or indexes a cache segment stored in cache segment area 50 (FIG. 2).

Each cache segment identified by a cache segment identifier may have the structure of the exemplary cache segment 102 shown in FIG. 3. Each such cache segment comprises a number of cache segment list elements, of which a first exemplary cache segment list element 104, a second exemplary cache segment list element 106, etc., through a last exemplary cache segment list element 108 are shown, with additional cache segment list elements indicated by an ellipsis symbol but not individually shown for purposes of clarity. In the exemplary embodiment, in which the above-referenced stripe 22 corresponds to 16 buffer blocks, each cache segment may correspondingly have 16 cache segment list elements so that each cache segment list element may correspond to one of those buffer blocks. Nevertheless, in other embodiments each cache segment may have any number of cache segment list elements.

Each cache segment list element includes the following flag fields: a buffer block identifier (BBID) field 110; a valid buffer block field or bit (V) 112; a dirty buffer block field or bit (D) 114; a flush buffer block field or bit (F) 116; and a use count (CNT) field 118. Although the manner in which the flags stored in these flag fields are used is discussed below with regard to write and read operations, the following may be noted. The valid (buffer block) bit 112 of a cache segment list element indicates whether the buffer block identified by the buffer block identifier field 110 of that cache segment list element is valid. As understood by one of skill in the art, the term "valid" is commonly used in the context of caching to denote locations in the cache memory to which data has been written. The dirty (buffer block) bit 114 of a cache segment list element indicates whether the buffer block identified by the buffer block identifier field 110 of that cache segment list element is dirty. As understood by one of skill in the art, the term "dirty" is commonly used in the context of caching to refer to cached data that has not yet been copied to back-end storage 14. The flush (buffer block) bit 116 of a cache segment list element indicates whether the buffer block identified by the buffer block identifier field 110 of that cache segment list element is in the process of being evicted or "flushed" to back-end storage 14. The use count field 118 of a cache segment list element indicates the number of data access requests, including read requests and flush operations, which are pending against the buffer block identified by the buffer block identifier field 110 of that cache segment list element. These fields of a cache segment thus serve as metadata describing aspects of the buffer blocks identified by the buffer block identifier fields 110 of that cache segment.

Figure 4:
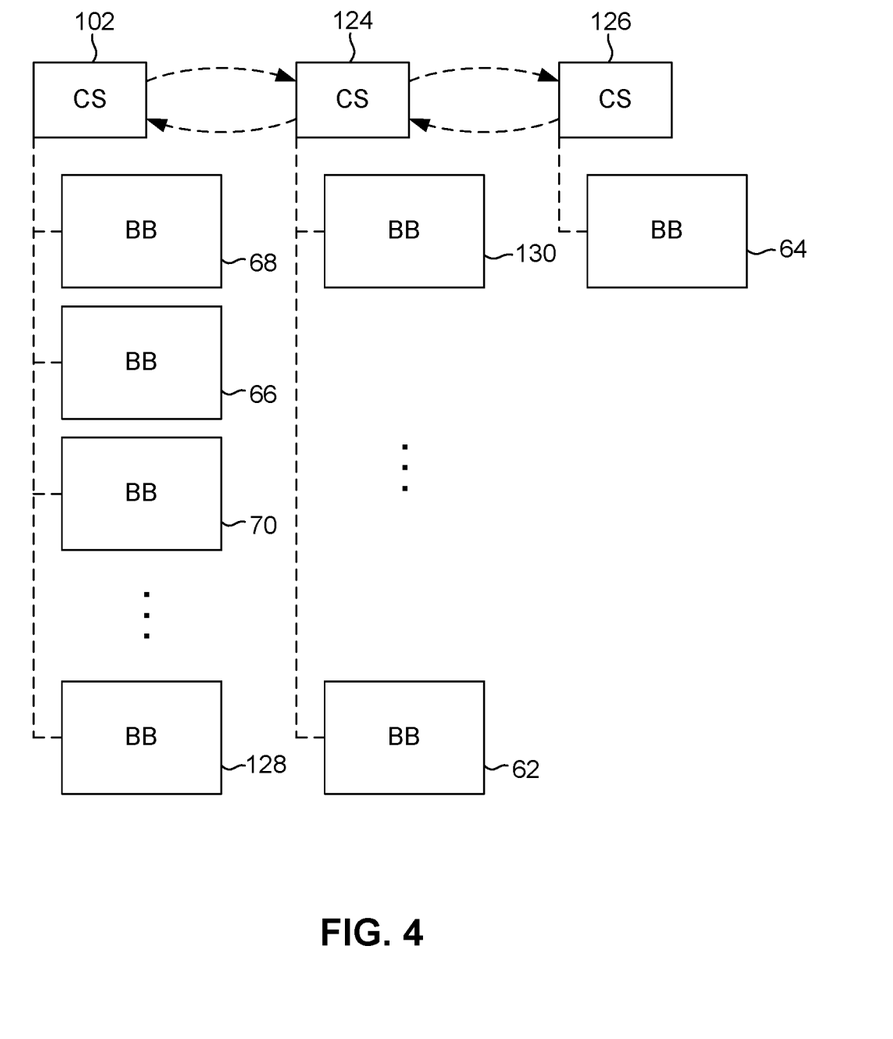
FIG. 4 is another data relationship diagram, illustrating an exemplary cache segment linked list and associated exemplary buffer blocks, in accordance with the exemplary embodiment.

Each cache segment also comprises a previous cache segment identifier field 120 and a next cache segment identifier field 122. As illustrated in FIG. 4, these fields can be used to link multiple cache segments in a doubly linked list. For example, another exemplary cache segment 124 can be linked to exemplary cache segment 102, and still another exemplary cache segment 126 can be linked to exemplary cache segment 124, etc. Other examples (not shown) of such doubly linked lists of cache segments may comprise any number of cache segments. Each cache segment in such a linked list identifies or is associated with (by its buffer block identifier fields 110) one or more buffer blocks stored in data area 48 (FIG. 1). For example, with reference to FIG. 4 and with additional reference again to FIG. 2: exemplary cache segment 102 may identify or be associated with exemplary buffer blocks 68, 66 and 70 as well as additional buffer blocks (not individually shown but represented by the ellipsis symbol) up to another exemplary buffer block 128; exemplary cache segment 124 may identify or be associated with yet another exemplary buffer block 130 as well as additional buffer blocks (not individually shown but represented by the ellipsis symbol) up to buffer block 62; and exemplary cache segment 126 may identify or be associated with buffer block 64.

Note that in accordance with the exemplary embodiment, in which the above-referenced stripe 22 corresponds to 16 buffer blocks: the 16 cache segment lists elements (not shown) of cache segment 102 correspond to 16 exemplary buffer blocks 68, 66, 70, etc., through 128; and the 16 cache segment lists elements (not shown) of cache segment 124 correspond to 16 exemplary buffer blocks 130, etc., through 62. Note in the example shown in FIGS. 2 and 4, the final cache segment 126 in the linked list corresponds to only one exemplary buffer block 64 because in this example the total number of buffer blocks involved is not a multiple of 16. In this example, one cache segment list element of cache segment 126 would contain a valid buffer block identifier, while the remaining 15 would not contain valid buffer block identifiers (and thus their valid bits would be "0" or de-asserted). As described below, a write request may indicate any number of buffer blocks to write. A write request indicating fewer buffer blocks than the number of cache segment list elements (e.g., 16) in a cache segment may require only one cache segment to complete, while a write operation indicating more than that number of buffer blocks may require multiple cache segments (linked together as described above).

Figure 5:
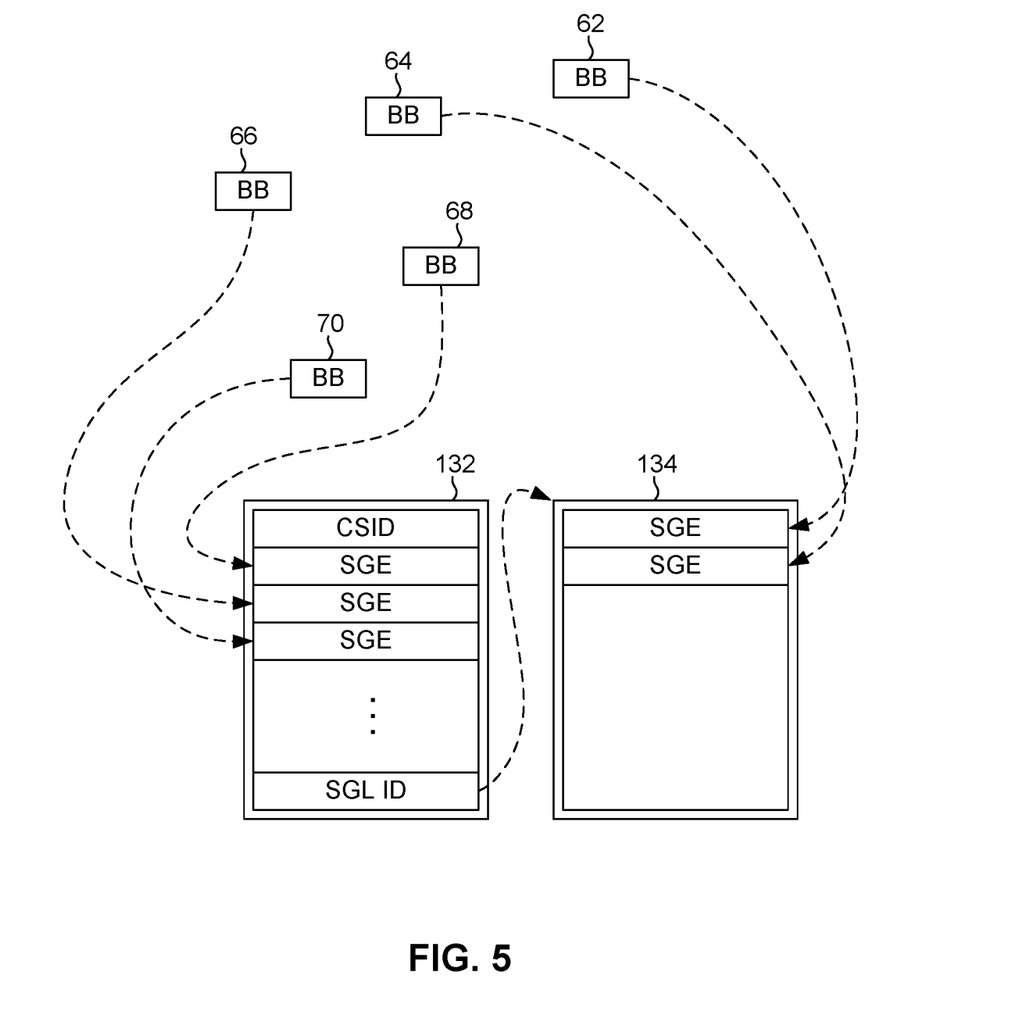
FIG. 5 illustrates exemplary scatter-gather lists, in accordance with the exemplary embodiment.

Scatter-gather lists (SGLs), which are data structures, may be employed to communicate information identifying physical locations in data area 48 in which buffer blocks are stored. Any number of SGLs may be linked together. For example, as illustrated in FIG. 5, a first SGL 132 may have scatter-gather entries (SGEs) containing information identifying the physical locations of exemplary buffer blocks 68, 66 and 70, while a second SGL 134 may have scatter-gather entries (SGEs) containing information identifying the physical locations of exemplary buffer blocks 62 and 64. First SGL 132 includes a link (SGL ID) pointing to second SGL 134. At least the first SGL 132 may also contain the cache segment identifier (CSID) of the cache segment associated with the buffer blocks.

Figure 6A:
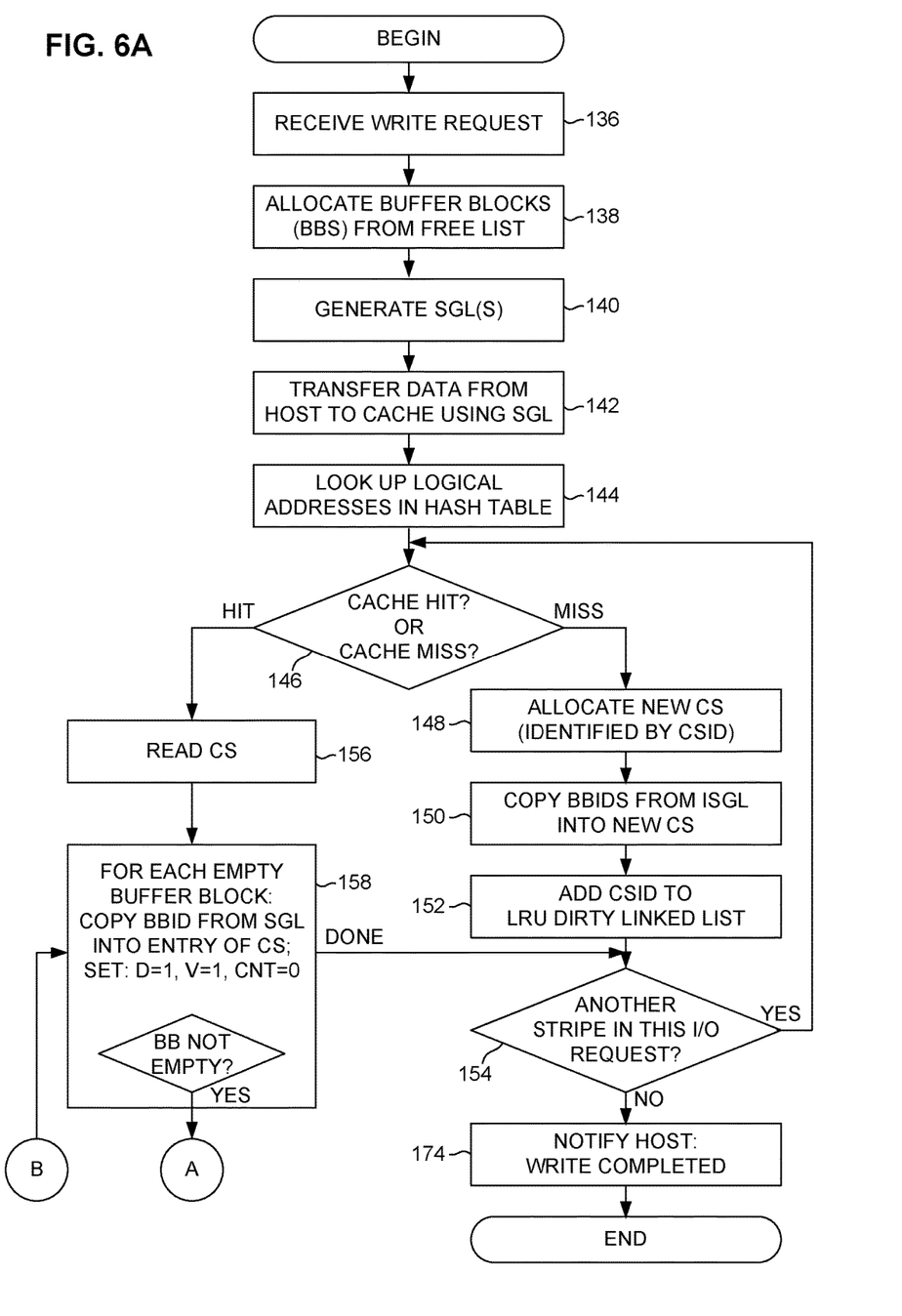
FIG. 6A is a flow diagram illustrating a write operation, in accordance with the exemplary embodiment.
Figure 6B:
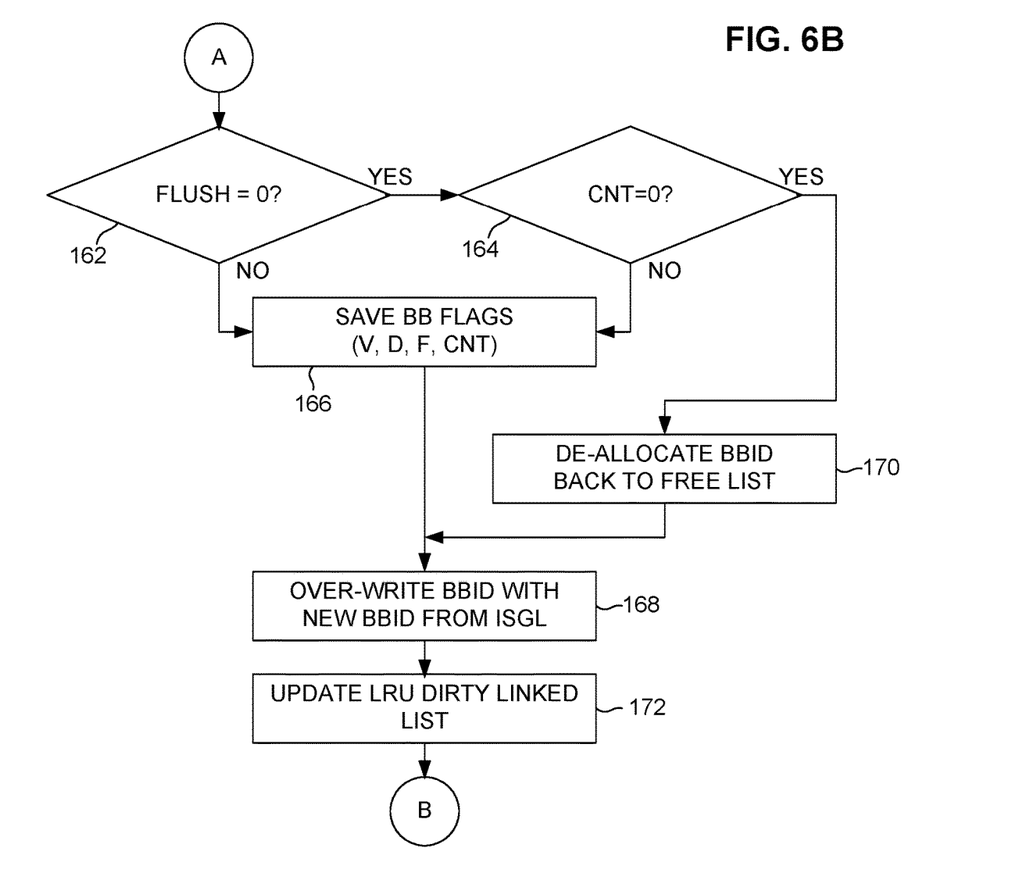
FIG. 6B is a continuation of the flow diagram of FIG. 6A.

As illustrated by the flow diagram of FIGS. 6A-6B, a write request may be processed as follows. As indicated by block 136, storage subsystem 10 receives the write request notification from host system 12. The write request indicates one or more logical addresses and one or more blocks of data to be written correspondingly to the one or more logical addresses. Data is received from host 12 in blocks of the same size as the buffer blocks, such as, for example, 4 KB. A write request can indicate any number of data blocks to be written. Referring additionally to FIG. 1, message processor 30 may receive the write request and provide information to command processor 32 that allows command processor 32 to initiate the write operation.

As indicated by block 138 (FIG. 6A), buffer processor 36 (FIG. 1) responds to initiation of a write operation by allocating one or more physical locations in data area 48 from a free list (not shown). The free list indicates physical locations in data area 48 in which no valid buffer blocks are stored and are thus available or "free" for buffer block storage. The physical locations are selected or allocated without regard to any order of the buffer blocks. For example, note in FIG. 2 that the physical locations in which exemplary buffer blocks 62, 64, 66, 68 and 70 are stored have no relation to each other except that each of those physical locations was listed in the free list at the time a write operation was performed that resulted in them being stored in those locations. The logical addresses of exemplary buffer blocks 62, 64, 66, 68 and 70 may follow an order indicated by the broken-line arrows between them, but that order has no relation to the physical locations in which they are stored in data area 48.

As indicated by block 140, one or more SGLs (not shown) containing information identifying the allocated physical locations may be generated. The SGLs are communicated to DMA engine 40 (FIG. 1). As further indicated by block 142, DMA engine 40 uses the SGL information to transfer the data blocks identified by the write request from host 12 to the allocated physical locations in data area 48. Stored in data area 48 of cache memory 24, the data blocks now define buffer blocks as described above.

As described below, following the transfer of data from host 12 to data area 48 in response to a write request, cache processor 34 (FIG. 1) updates metadata to complete the write operation. It should be noted that the completion of the write operation in response to a write request is atomic, in the sense that the transfer of data cannot be interrupted by a read operation. Stated another way, after the buffer blocks have been stored in the physical locations in data area 48, metadata is updated to associate the physical locations with the logical addresses, without regard to whether any read requests are pending against the logical addresses. In the lexicon of transaction processing, cache processor 34 "commits" the write transaction by updating the metadata, thereby ensuring atomicity. The following operations relate to updating such metadata.

As indicated by block 144, cache processor 34 look ups the one or more logical addresses identified in the write request in the above-described hash table 80 (FIG. 3). As described above, the hash function 84 resolves the logical address into an index to a slot in hash table 80. As indicated by block 146, cache processor 34 compares the logical address with each of the entries in that slot to determine if there is a match or "hit," indicating that data is already cached in that logical address. If none of the four entries is a match, cache processor 34 may follow the above-described linked list to additional entries. If no entries match the logical address, the result of the hash table lookup is a "miss."

If cache processor 34 determines (block 146) that the result of a hash table lookup is a miss, then cache processor 34 allocates a new cache segment, as indicated by block 148. The new cache segment is identified by a CSID as described above. Cache processor 34 stores the CSID in an available one of the slot entries, or, if all (e.g., four) entries of the slot itself are occupied, then the CSID of the "link" entry of the slot is updated to set the next hash link to the newly added CSID. The previous hash link of the new CSID is set to the CSID of the "link" entry in the referenced slot of the hash table. Then, as indicated by block 150, for each cache segment list element in the newly allocated cache segment, cache processor 34 copies the buffer block identifiers from the SGL into the buffer block identifier fields 110 (FIG. 3), and sets their valid bits and dirty bits, as well as clears the flush bit and use count. Also, as indicated by block 152, cache processor 34 adds the cache segment identifier of the newly allocated cache segment to the tail of a least-recently used (LRU) dirty linked list (not shown). The LRU dirty linked list may be used in flushing the cached data to back-end storage 14, as described below. The operations indicated by blocks 146, 148, 150 and 152 relate to one stripe 22 of data in the write request. As indicated by block 154, if the write request spans more than one stripe 22, these operations are repeated for each stripe 22 for which the result of the hash table lookup is a miss.

If cache processor 34 determines (block 146) that the result of a hash table lookup is a hit, then cache processor 34 reads the cache segment identified by the slot entry, as indicated by block 156. Then, as indicated by block 158, for each cache segment list element that is "empty," i.e., that does not already contain a valid buffer block identifier in its buffer block identifier field 110, cache processor 34 copies the buffer block identifier from the SGL into that buffer block identifier field 110. In that cache segment list element, cache processor 34 also sets the following flags (FIG. 3): the valid bit 112 is set to a value of "1" ("true"); the dirty bit 114 is set to a value of "1" ("true"); and the use count 118 is set to a value of zero. For any cache segment list element that is not empty, i.e., that contains a valid buffer block identifier, processing continues at block 162 (FIG. 6B).

As indicated by blocks 162 and 164, if cache processor 34 determines that the flush bit 116 of the cache segment list element is not "0" ("false") or the use count 118 of the cache segment list element contains a value other than zero, then, as indicated by block 166, cache processor 34 copies or saves the flags (i.e., the values of valid bit 112, dirty bit 114, flush bit 116 and use count field 118) into, for example, the miscellaneous area 56 of cache memory 24 (FIG. 1) (as indexed by the original list element BBID value). Once the flags are saved, then cache processor 34 may overwrite the buffer block identifier field 110 of that cache segment list element with the buffer block identifier obtained from the SGL, as indicated by block 168. The flags are set to the same stage as for a newly written buffer block: flush=0, dirty=1, valid=1, use count=0.

However, if cache processor 34 determines (blocks 162 and 164) that the flush bit 116 of the cache segment list element is "0" ("false") and the use count 118 of the cache segment list element contains a value of zero, then, as indicated by block 170, cache processor 34 de-allocates the buffer block identifier that is in the buffer block identifier field 110 of that cache segment list element. That is, the buffer block identifier is returned to the above-referenced free list. Then, cache processor 34 overwrites the buffer block identifier fields 110 of that cache segment with the buffer block identifiers obtained from the SGL, as indicated by block 168.

Also in response to a hash table hit, cache processor 34 updates the LRU dirty linked list, as indicated by block 172. More specifically, if it is determined that the cache segment identifier already exists in a location the LRU dirty linked list, then the cache segment identifier is removed from that location, and a new location for that cache segment identifier is added to (i.e., linked to) the tail of the LRU dirty linked list. Thus, the most recently written cache segment identifiers are moved to the tail of the LRU dirty linked list. As described below, maintaining the LRU dirty linked list in this manner facilitates evicting or flushing less recently written (i.e., oldest) data to back-end storage 14. The process then continues as described above with regard to block 158.

If the write request spans more than one stripe 22, the above-described operations are repeated for each stripe 22 for which the result of the hash table lookup is a hit, as indicated by block 154. When all stripes 22 of the write operation have been processed in the above-described manner, host 12 is notified that the write operation has been completed, as indicated by block 174.

As illustrated by the flow diagram of FIG. 7, a read request may be processed as follows. As indicated by block 180, storage subsystem 10 receives the read request from host system 12. The read request indicates one or more logical addresses from which data is to be read. A read request may indicate the amount of data to be read. Host system 12 read blocks of data of the same size as the buffer blocks, such as, for example, 4 KB. Referring additionally to FIG. 1, message processor 30 may receive the read request and provide information to command processor 32 that allows command processor 32 to initiate the read operation.

Figure 7A:
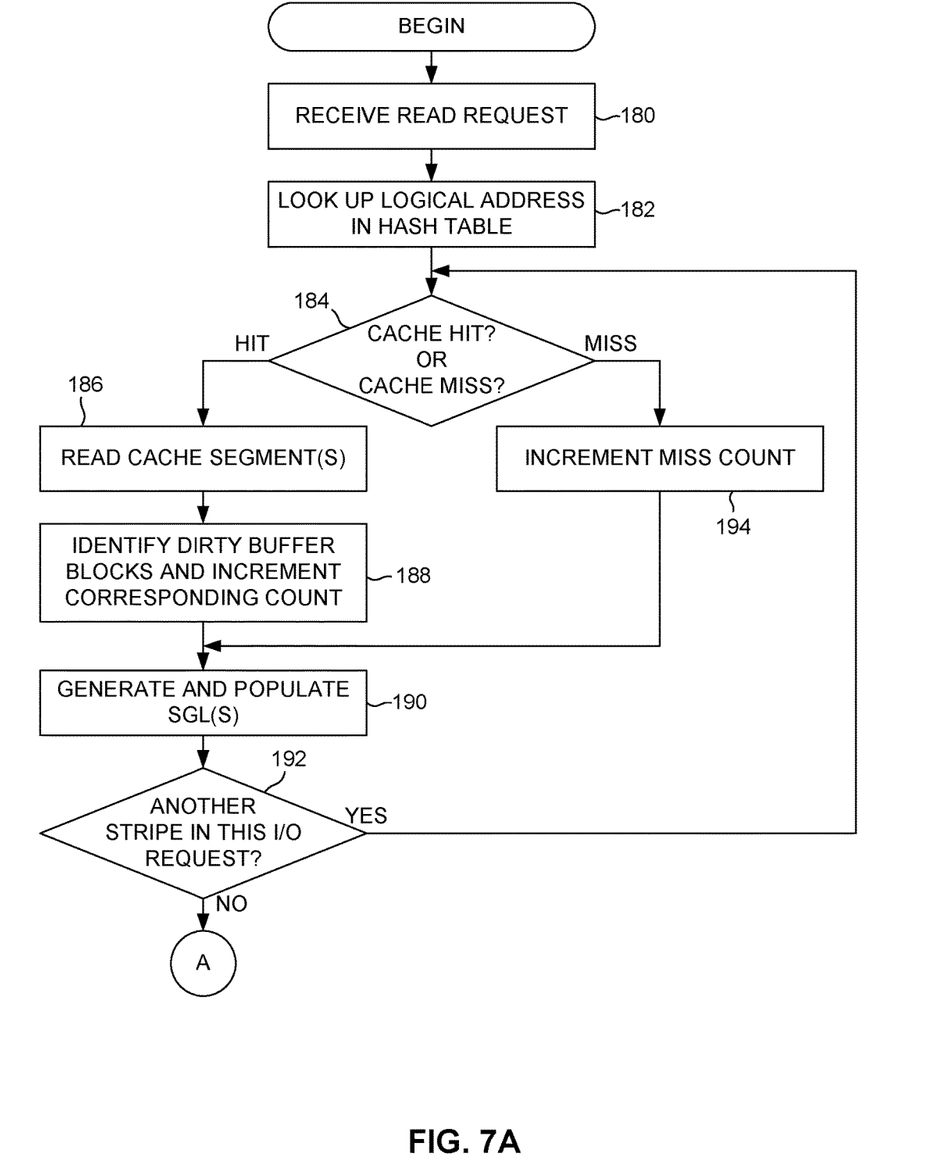
FIG. 7A is a flow diagram illustrating a read operation, in accordance with the exemplary embodiment.

As indicated by block 182, cache processor 34 responds to initiation of the read operation by performing a lookup in hash table 80 (FIG. 3). That is, in the same manner described above with regard to write operations, the hash function 84 is applied to each logical address to produce one or more indexes into hash table 80. Each index indicates one slot to be read. The number of slots to read from hash table 80 depends on the amount of data indicated by the read request. As described above, each slot represents one stripe 22, which may correspond to, for example, 64 KB. The read request may span multiple stripes 22. Each of the indicated slots is read to determine whether the result is a hit or a miss. More specifically, there are three possible outcomes for a read operation: all of the requested data may exist in data area 48 (which result is referred to as a full hit); some of the requested data may exist in data area 48 (which result is referred to as a partial hit); or none of the requested data may exist in data area 48 (which result is referred to as a miss or full miss).

As indicated by block 184, if cache processor 34 determines that the result of the hash table lookup is a hit (which may be a full hit or a partial hit), then cache processor 34 reads the cache segments indicated by the entry that resulted in the hit, as indicated by block 186. As described above with regard to FIG. 3, each cache segment list element of that cache segment has a valid (buffer block) bit 112 that indicates whether the buffer block identified in the buffer block identifier field 110 of that cache segment list element is valid. The least-significant bits of the logical address indicated in the read request can be used to identify the beginning of the cache segment list elements containing the buffer block identifiers of the requested buffer blocks. Then, as indicated by block 188, for each of the requested buffer blocks that is determined to be valid and dirty by the valid bit 112 and dirty bit 114, respectively, of the cache segment list element in which that buffer block is identified, cache processor 34 increments the value or count in the use count field 118 of that cache segment list element. As indicated by block 190, cache processor 34 then generates and populates one or more SGLs (not shown) to be used in reading the data from data area 48. Cache processor 34 then determines whether the read request spans another stripe 22, as indicated by block 192. If another stripe 22 is to be read, then processing returns to block 184. If it is determined (block 184) that the result of the hash table lookup is a miss, then cache processor 34 increments a miss count, as indicated by block 194, and processing continues as described above with regard to block 192.

Figure 7B:
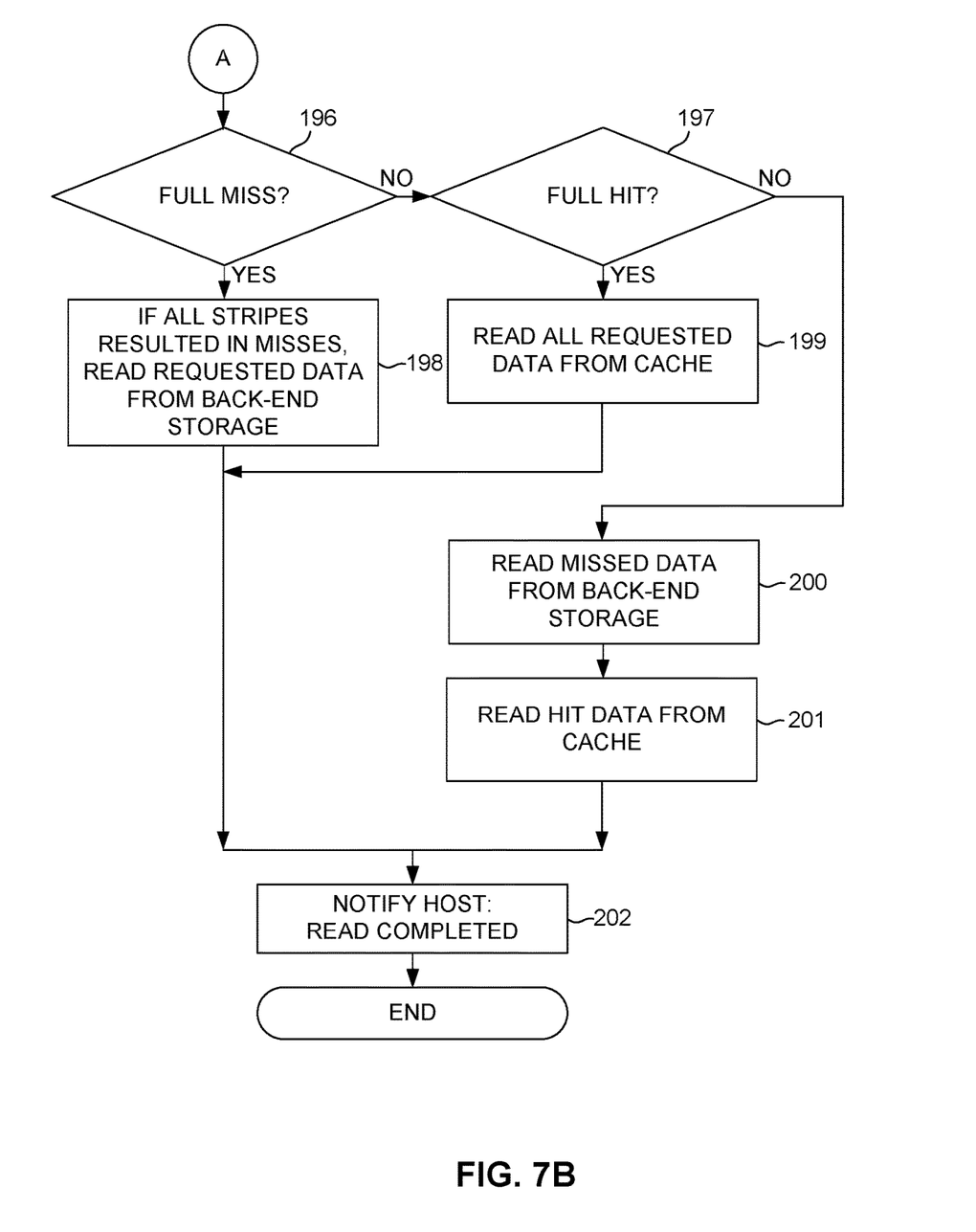
FIG. 7B is a continuation of the flow diagram of FIG. 7A.

After all stripes associated with the read request have been read, processing continues at block 196 (FIG. 7B). Cache processor 34 can use the above-referenced miss count to determine (block 196) whether the result is a full miss, i.e., none of the stripes are hits, or a full hit (block 197), i.e., all of the stripes are hits. If cache processor 34 determines (block 196) that the result is a full miss, then back-end processor 38 (FIG. 1) reads the requested data from back-end storage 14 (FIG. 1), as indicated by block 198. DMA engine 40 may participate in transferring the data from back-end storage 14 to host 12. If cache processor 34 determines (block 197) that the result is a full hit, then cache processor 34 reads all of the requested data from data area 48 (FIG. 2), as indicated by block 199. If cache processor 34 determines that the result is a partial hit, i.e., neither a full miss (block 196) nor a full hit (block 197), then cache processor 34 reads those buffer blocks of the requested data that cannot be found in data area 48 from back-end storage 14, as indicated by block 200, and reads those buffer blocks of the requested data that can be found in data area 48 from data area 48, as indicated by block 201. When the data transfer is completed, host 12 is notified that the read operation has been completed, as indicated by block 202.

As stated above, an SGL can be used to facilitate the transfer of data from data area 48. In the case of a partial hit rather than a full hit, cache processor 34 uses the information identifying dirty and not-dirty buffer blocks to include information in the SGL indicating which of the buffer blocks to read from data area 48 and which to "skip over" in data area 48 and to instead read from back-end storage 14. Buffer blocks that are valid and dirty must be read from data area 48, but buffer blocks that are valid and not-dirty may be read from back-end storage 14. Cache manager 34 sends the SGL (or multiple SGLs linked together) either to back-end processor 38 in the case of a partial hit, or to DMA engine 40 in the case of a full hit. As indicated by block 200, the requested buffer blocks are then read from data area 48, back-end storage 14, or a combination of both data area 48 and back-end storage 14.

Figure 8:
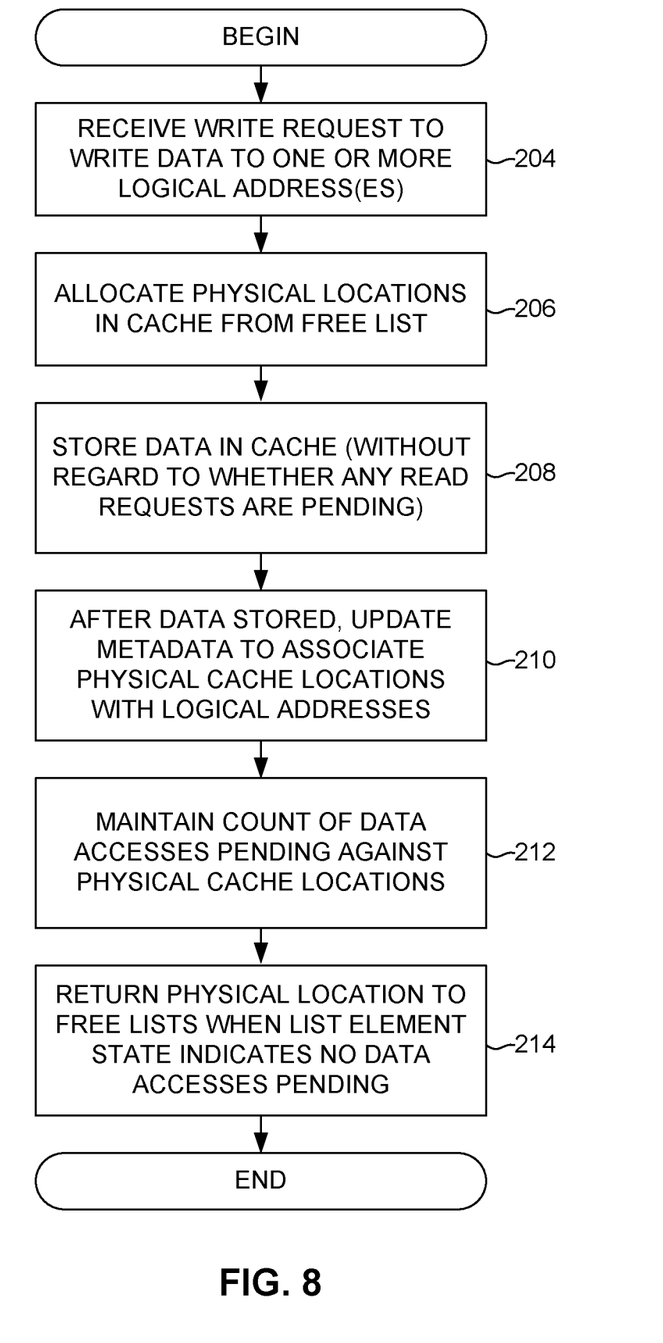
FIG. 8 is a flow diagram illustrating a method of operation of the system, in accordance with the exemplary embodiment.

As illustrated in FIG. 8, a caching method may include: (block 204) receiving a write request indicating one or more logical addresses and one or more data blocks to be written correspondingly to the one or more logical addresses; (block 206) in response to the write request, allocating one or more physical locations in the cache memory from the free list; (block 208) storing the one or more data blocks in the one or more physical locations without regard to whether any read requests to the one or more logical addresses are pending; (block 210) after the one or more data blocks have been stored in the one or more physical locations, and without regard to whether any read requests are pending against the one or more logical addresses, updating metadata to associate the one or more physical locations with the one or more logical addresses; (block 212) maintaining a count of data access requests or "uses" pending against each physical location in the cache memory having valid data; and (block 214) returning a physical location to the free list when the use count indicates no data access requests are pending against the physical location. It can be noted that when a physical location is returned to the free list (block 214), the valid bit of the corresponding cache segment list element is deasserted.

Figure 9:
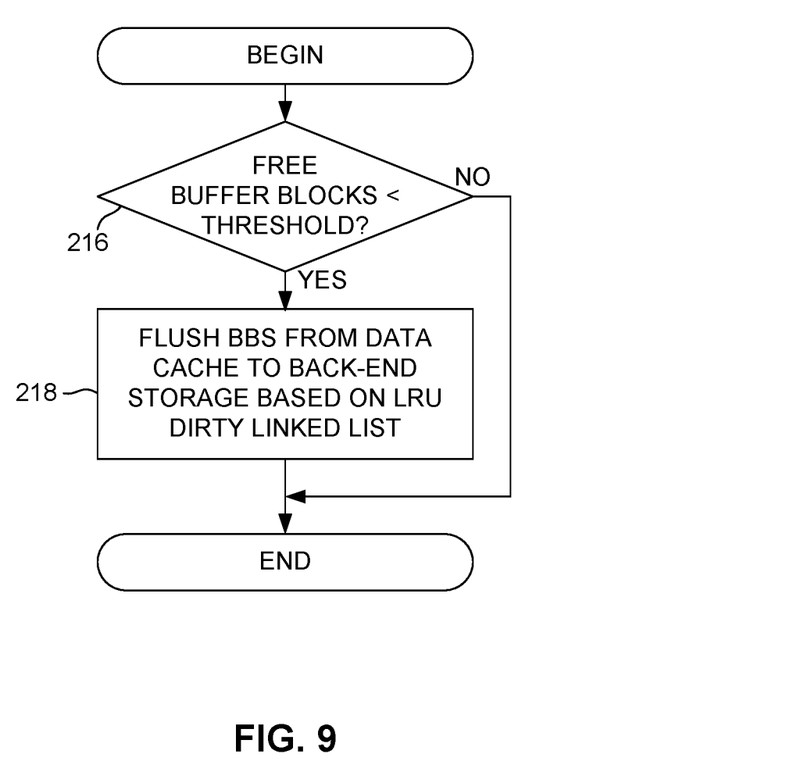
FIG. 9 is a flow diagram illustrating a flush operation, in accordance with the accordance with the exemplary embodiment.

Transferring data from data area 48 to back-end storage 14, which is commonly referred to in the art as evicting data or flushing data from cache memory, is not described in detail, as evicting or flushing data can be performed in a conventional manner understood by one of ordinary skill in the art. Briefly, with reference to the flow diagram of FIG. 9, buffer blocks can be flushed from data area 48 to back-end storage 14 when it is determined that the number of buffer blocks in the free list has decreased below a threshold, as indicated by block 216. As indicated by block 218, the above-described LRU dirty linked list can facilitate flushing because the cache segment identifying the least recently written buffer blocks is maintained at the head of the LRU dirty linked list. Such least recently written buffer blocks can be flushed to back-end storage 14 and the LRU dirty linked list updated to remove the corresponding cache segment. Note that such a flush operation can be performed independently of the above-described write and read operations, i.e., in the background. In addition, although not shown for purposes of clarity in FIG. 9, after one or more buffer blocks are flushed, the use count is decremented as indicated by block 212 in FIG. 8. Similarly to block 214 in FIG. 8, if the decremented use count is zero, indicating that no read requests or flush operations (collectively referred to herein as data access requests) are pending against a physical location (identified by a BBID), the physical location is returned to the free list, and the valid bit of the corresponding cache segment list element is de-asserted.

It should be understood that the flow diagrams of FIGS. 6A-6B and 7A-7B, 8, and 9 are intended only to be exemplary or illustrative of the logic underlying the described methods. Persons of skill in the art can appreciate that in various embodiments a storage subsystem can be configured in any of various ways to effect the described methods. In some embodiments, the steps or acts described above with regard to FIGS. 6A-6B, 7A-7B, 8, and 9 can occur in any suitable order or sequence, including in parallel or asynchronously with each other. In some embodiments, steps or acts described above can be combined with others or omitted. Although depicted for purposes of clarity in the form of individual processing elements in FIG. 1 and individual flow diagrams in FIGS. 6A-6B, 7A-7B, 8, and 9, the underlying logic can be modularized or distributed among any combination of hardware or software elements in any suitable manner.

It should be noted that the invention has been described with reference to one or more exemplary embodiments for the purpose of demonstrating the principles and concepts of the invention. The invention is not limited to these embodiments. As will be understood by persons skilled in the art, in view of the description provided herein, many variations may be made to the embodiments described herein and all such variations are within the scope of the invention.

What is claimed is:

1. A method for caching in a data storage subsystem, comprising:
   receiving a write request indicating one or more logical addresses and one or more data blocks to be written correspondingly to the one or more logical addresses;
   in response to the write request, allocating one or more physical locations in a cache memory from a free list;
   storing the one or more data blocks in the one or more physical locations;
   determining a hash table slot in response to a logical address;
   determining whether any of a plurality of entries in the hash table slot identifies the logical address;
   storing identification information identifying the one or more physical locations in one or more data structures;
   updating an entry in a hash table to include a pointer to the one or more data structures;
   maintaining a count of data access requests, including read requests, pending against each physical location in the cache memory having valid data; and
   returning a physical location to the free list when the count indicates no data access requests are pending against the physical location.

2. The method of claim 1, wherein allocating the one or more physical locations comprises selecting the one or more physical locations from the free list without regard to order of the one or more physical locations in the cache memory.

3. The method of claim 1, wherein allocating the one or more physical locations comprises selecting the one or more physical locations from the free list without regard to the one or more logical addresses associated with the write request.

4. The method of claim 1, wherein:
   allocating the one or more physical locations comprises generating a scatter-gather list (SGL) containing information identifying the one or more physical locations; and
   storing the one or more data blocks in the one or more physical locations comprises:
      providing the SGL to a direct memory access (DMA) engine; and
      the DMA engine transferring the one or more data blocks from a host interface to the cache memory in response to the SGL.

5. The method of claim 1, wherein the one or more data structures define a linked list.

6. The method of claim 5, wherein the method further comprises adding a new data structure to the linked list in response to determining that none of the entries in the hash table slot identifies the logical address.

7. The method of claim 6, further comprising adding information identifying the new data structure in the linked list to a least recently used dirty list.

8. The method of claim 1, wherein each of the one or more data structures includes a plurality of sub-structures, each sub-structure configured to store the identification information identifying one of the physical locations in the cache memory, each sub-structure further configured to store the count of data access requests pending against the physical location identified by the identification information.

9. The method of claim 8, wherein each sub-structure is further configured to store a dirty indicator indicating whether the physical location identified by the identification information contains dirty data.

10. A system for caching in a data storage subsystem, comprising:
a cache memory; and
a processing system configured to:
receive a write request indicating one or more logical addresses and one or more data blocks to be written correspondingly to the one or more logical addresses;
in response to the write request, allocate one or more physical locations in a cache memory from a free list;
store the one or more data blocks in the one or more physical locations;
determine a hash table slot in response to a logical address;
determine whether any of a plurality of entries in the hash table slot identifies the logical address;
store identification information identifying the one or more physical locations in one or more data structures;
update an entry in a hash table to include a pointer to the one or more data structures;
maintain a count of data access requests, including read requests, pending against each physical location in the cache memory having valid data; and
return a physical location to the free list when the count indicates no data access requests are pending against the physical location.

11. The system of claim 10, wherein the processing system is configured to allocate the one or more physical locations by being configured to select the one or more physical locations from the free list without regard to order of the one or more physical locations in the cache memory.

12. The system of claim 10, wherein the processing system is configured to allocate the one or more physical locations by being configured to select the one or more physical locations from the free list without regard to the logical addresses associated with the write request.

13. The system of claim 10, wherein:
the processing system is configured to allocate the one or more physical locations by being configured to generate a scatter-gather list (SGL) containing information identifying the one or more physical locations; and
the processing system is configured to store the one or more data blocks in the one or more physical locations by being configured to:
provide the SGL to a direct memory access (DMA) engine; and
transfer, by the DMA engine, the one or more data blocks from a host interface to the cache memory in response to the SGL.

14. The system of claim 10, wherein the one or more data structures define a linked list.

15. The system of claim 14, wherein the processing system is configured to add a new data structure to the linked list in response to determining that none of the entries in the hash table slot identifies the logical address.

16. The system of claim 15, wherein the processing system is further configured to add information identifying the new data structure in the linked list to a least recently used dirty list.

17. The system of claim 10, wherein each of the one or more data structures includes a plurality of sub-structures, each sub-structure configured to store the identification information identifying one of the physical locations in the cache memory, each sub-structure further configured to store the count of data access requests pending against the physical location identified by the identification information.

18. The system of claim 17, wherein each sub-structure is further configured to store a dirty indicator indicating whether the physical location identified by the identification information contains dirty data.

* * * * *